United States Patent [19]

Okabe et al.

[11] 4,001,372
[45] * Jan. 4, 1977

[54] REMOVING OXIDES OF NITROGEN FROM GASEOUS MIXTURES WITH ALKALI MANGANATE SOLUTIONS

[75] Inventors: Taijiro Okabe; Akitsugu Okuwaki, both of Sendai; Shigetoshi Nakabayashi, Shinminato, all of Japan

[73] Assignee: Mitsubishi Kinzoku Kabushiki Kaisha, Tokyo, Japan

[ * ] Notice: The portion of the term of this patent subsequent to Dec. 16, 1992, has been disclaimed.

[22] Filed: July 1, 1975

[21] Appl. No.: 592,318

Related U.S. Application Data

[63] Continuation-in-part of Ser. No. 332,792, Feb. 16, 1973, Pat. No. 3,929,966.

[30] Foreign Application Priority Data

Feb. 19, 1972 Japan ............................. 47-17556

[52] U.S. Cl. ................................................ 423/235
[51] Int. Cl.$^2$ ........................................ C01B 21/00
[58] Field of Search .......... 423/235, 239, 599, 402, 423/404, 212, 213, 395; 252/471; 55/68, 74

[56] References Cited

UNITED STATES PATENTS

| | | | |
|---|---|---|---|
| 956,120 | 4/1910 | Machalske | 423/599 |
| 1,616,900 | 2/1927 | Kassner | 423/395 |
| 3,927,177 | 12/1975 | Okabe et al. | 423/235 |
| 3,929,966 | 12/1975 | Okabe et al. | 423/239 |

FOREIGN PATENTS OR APPLICATIONS

| | | | |
|---|---|---|---|
| 226,568 | 9/1968 | U.S.S.R. | 423/239 |

OTHER PUBLICATIONS

Chemical Abstracts, vol. 53, No. 8555g (1959).
Petriashvili et al., "Stability of Potassium Permanganate and Manganate in Potassium Hydroxide Solutions", Chem. Abstr., vol. 73, 1970, No. 115,944k.

*Primary Examiner*—Earl C. Thomas
*Assistant Examiner*—Brian E. Hearn
*Attorney, Agent, or Firm*—Wenderoth, Lind & Ponack

[57] ABSTRACT

There is disclosed a method for removing oxides of nitrogen from gaseous mixtures by contacting the gaseous mixtures with an alkaline solution of an alkali metal manganate.

6 Claims, No Drawings

REMOVING OXIDES OF NITROGEN FROM GASEOUS MIXTURES WITH ALKALI MANGANATE SOLUTIONS

CROSS REFERENCE TO RELATED APPLICATION

This application is a continuation-in-part of application Ser. No. 332,792, filed on Feb. 16, 1973, now U.S. Pat. No. 3,929,966.

BACKGROUND OF THE INVENTION

This invention relates to a method for removing oxides of nitrogen (or nitrogen oxides) from gaseous mixtures containing such oxides of nitrogen. More particularly, this invention is concerned with a removal of the oxides of nitrogen from atmospheric air and other gaseous mixtures containing therein oxides of nitrogen consisting predominantly of nitric oxide (NO) and nitrogen dioxide ($NO_2$) by containing such gaseous mixtures with an aqueous alkaline solution of an alkali metal manganate.

It has been too well recognized that exhaust gases from internal combustion engines, nitric acid plants, thermal power plants, and so forth contain from several hundred to several thousand ppm of nitrogen oxides consisting mainly of nitric oxide and nitrogen dioxide, which are liable to bring about public harm (or the so-called "air pollution") in the form of photo-chemical smog, etc. Among such waste gases, a waste gas containing a high concentration of nitrogen oxides and little dust such as that discharged from nitric acid plants has already been treated on a practical and industrialized scale by washing with alkali or catalytic reduction method so as to remove the nitrogen oxides, and such a method has been practically successful. In case, however, the exhaust gas contains a low concentration of nitrogen oxides consisting mainly of nitric oxide such as that discharged from several types of boilers or internal combustion engines, there has so far been no effective method of removing the nitrogen oxides from such an exhaust gas, which has resulted in a great social problem.

The inventors have, for the purpose of solving the public harm problem due to the nitrogen oxides, made a research for an absorbing agent which shows a high absorbing capability for nitric oxide as well as nitrogen dioxide, and is inexpensive and easy to obtain. As a result of the research, the present inventors have recognized that an alkali metal mangnate or a mixture of a manganese compound and an alkali producing an alkali metal manganate under the conditions of the use of the mixture which has both oxidizing and absorbing capabilities for nitric oxide and nitrogen dioxide can be an effective absorbing agent for nitrogen oxides (NO + $NO_2$), and applied for a patent as application Ser. No. 332,792, the parent application of this application. Further, the inventors have also recognized that an alkali metal manganate in the form of an aqueous alkaline solution shows a high absorption rate for any of nitric oxide and nitrogen dioxide, and is extremely effective for the same purpose, which is the subject theme of the present invention.

SUMMARY OF THE INVENTION

It is therefore a primary object of the present invention to provide a method for removing oxides of nitrogen (NOx) existing in a gaseous mixture and consisting mainly of nitric oxide and nitrogen dioxide, which consists essentially of subjecting the gaseous mixture to a contact-reaction with an alkali metal manganate in the form of an alkali hydroxide solution, thereby absorbing the oxides of nitrogen into said alkali metal manganate.

The foregoing object and other objects as well as the principle of the present invention will become more apparent from the following detailed description of the invention together with a few preferred examples thereof.

DETAILED DESCRIPTION OF THE INVENTION

The alkali metal manganates (hereinafter merely referred as alkali manganate) to be used in the present invention are sodium manganate ($Na_2MnO_4$) and potassium manganate ($K_2MnO_4$). These compounds are produced by adding the corresponding alkali hydroxides to a manganese ore such as pyrolusite and heat-treating the same at a temperature of 250° – 500° C. The reaction in this case is as follows:

$$MnO_2 + 2KOH + \tfrac{1}{2} O_2 = K_2MnO_4 + H_2O \qquad (1)$$

This reaction corresponds to the first step of the production of potassium permanganate, and the thus heat-treated product is eluted with water to prepare an aqueous solution of $K_2MnO_4$, which is further electrolytically oxidized to $KMnO_4$. Thus, $K_2MnO_4$ is an intermediate product to be obtained in the course of $KMnO_4$ production, so that it can be obtained in less process steps than $KMnO_4$ and at a low cost. $Na_2MnO_4$ can also be produced in the same manner as $K_2MnO_4$ at a lower cost.

When an alkali manganate is used in the form of an aqueous solution to absorb nitrogen oxides, an alkali hydroxide is added to the aqueous solution to prepare an absorbent solution. While the composition of the absorbent solution is determined according to the effect of removing objective nitrogen oxides and the conditions of use, the concentration of the alkali manganate is within the range of from 0.01 to 1 M (M: mol/liter), preferably from 0.05 to 0.5M. The concentration of below 0.01 M results in too low an absorbing rate, and the concentration of above 1 M increases the absorbing rate very little, both not being desirable for practical use. The alkali hydroxide to be added is required to suppress the hydrolysis of the alkali manganate according to the following equation (2), $$3MnO_4^{2-} + 2H_2O = 2MnO_4^- + MnO_2 + 4\,OH^- \qquad (2)$$

and the concentration thereof is from 0.5 to 5N. The higher the concentration of alkali manganate is, the higher concentration of alkali hydroxide is used. The above product of reaction (1) usually contains an excess of alkali hydroxide, and the eluted solution thereof can, after being adjusted as to the concentration, be used as an absorbent solution as it is. If the concentration of alkali hydroxide is not sufficient, an additional amount of alkali hydroxide is added to the eluted solution to prepare an absorbent solution of pre-determined alkali hydroxide concentration.

The absorption (or reaction-absorption) of nitrogen oxides by an aqueous alkaline solution of the present invention is carried out generally at a temperature of from room temperature to about 80° C from an economical standpoint, while the absorbing capability of the solution increases a little as the absorbing temperature increases. The solubility of alkali manganate can be increased by raising the temperature, so that the above concentration range of 0.01 – 1M with respect to alkali manganate can be used without problem.

The absorption proceeds quantitatively and rapidly according to the following formulae (3) and (4) which are expressed with respect to $K_2MnO_4$ as an example of the alkali manganates, both NO and $NO_2$ being oxidized to form a nitrate, and manganese being precipitated as $MnO_2$:

$$K_2MnO_4 + 2NO + O_2 = 2KNO_3 + MnO_2 \quad (3)$$

$$K_2MnO_4 + 2NO_2 = 2KNO_3 + MnO_2 \quad (4).$$

While the effect of nitrogen oxide removal by the process of this invention is difficult to describe in general since it is affected by the composition of the absorbent solution, conditions of absorption and apparatus to be used, when a waste gas containing from 100 to 2,000 ppm of nitrogen oxides is, for example, treated in a packed tower of counter-current type, 90% or more of the nitrogen oxides can be removed in a contact time of about 10 to 15 seconds regardless of the ratio of NO to $NO_2$ in the nitrogen oxides. However, the absorbent solution of the present invention containing an alkali manganate has an strong absorption property for NO which is usually difficult to remove, so that the absorbent solution is especially advantageous to be used to treat a waste gas containing more NO than $NO_2$.

As stated in the foregoing, the present invention, which utilizes a simple absorbing agent principally consisting of alkali manganate, can exhibit highly improved rate of removal of nitrogen oxides in comparison with conventional methods, hence it provides extremely effective means to solve the air-pollution problems, the industrial merit of which is therefore considered great.

For the purpose of enabling those skilled in the art to reduce this invention into practice, the following preferred examples are presented. It should, however, be noted that these examples are illustrative only and do not limit the scope of the present invention.

EXAMPLE 1A

This example is presented to show that alkali manganate is substantially stable in an alkaline aqueous solution, while it is liable to hydrolyze in a neutral aqueous solution.

In 100 cc of water or an aqueous solution of potassium hydroxide, 4.6 g of reagent grade potassium manganate was dissolved, and the resulting solution was stirred for 30 minutes at room temperature. The solution, after being separated from manganese dioxide by filtration, was subjected to quantitative analysis for manganate ions ($MnO_4^{2-}$) and permanganate ions ($MnO_4^-$).

The results are set forth in the following Table 1A.

Table 1A

| Concentration of KOH (N)*1 | $[MnO_4^{2-}]$ (M)*2 | $[MnO_4^-]$ (M) | $[MnO_4^{2-}]:[MnO_4^-]$ |
|---|---|---|---|
| 0 | 0.082 | 0.063 | 1 : 0.77 |
| 2 | 0.161 | 0.010 | 1 : 0.06 |
| 4 | 0.164 | 0.007 | 1 : 0.04 |

*1:N: Normal; This value was calculated on the basis of initially added KOH.
*2:M: mol/liter

EXAMPLE 1B

This example is also presented to show that alkali manganate is substantially stable in an alkaline aqueous solution.

The procedure of Example—1A was repeated with several other manganate concentrations and hydroxide concentrations as set forth in the following Table 2. The method of quantitative analysis was not identical between Examples 1 and 1B, but would not affect the results.

The results are also set forth in Table 1B.

Table 1B

| Concentration of KOH(N)*1 | PH | $[MnO_4^{2-}]$ (M)*2 | $[MnO_4^-]$ (M) | $[MnO_4^{2-}]:[MnO_4^-]$ |
|---|---|---|---|---|
| 0 | 12.3 | 0.0010 | 0.0041 | 1 : 4.10 |
| 0 | 13.2 | 0.0287 | 0.0265 | 1 : 0.92 |
| 0 | 13.5 | 0.560 | 0.0912 | 1 : 0.16 |
| 0 | 13.7 | 0.811 | 0.0720 | 1 : 0.089 |
| 0.5 | — | 0.0066 | 0.0005 | 1 : 0.08 |
| 0.5 | — | 0.0631 | 0.0042 | 1 : 0.067 |
| 0.5 | — | 0.624 | 0.0500 | 1 : 0.080 |
| 0.5 | — | 0.897 | 0.0404 | 1 : 0.045 |
| 2.0 | — | 0.0069 | 0 | — |
| 2.0 | — | 0.0686 | 0.0011 | 1 : 0.016 |
| 2.0 | — | 0.685 | 0.0108 | 1 : 0.016 |
| 2.0 | — | 0.917 | 0.0208 | 1 : 0.023 |
| 5.0 | — | 0.0073 | 0 | — |
| 5.0 | — | 0.0683 | 0 | — |
| 5.0 | — | 0.273*3 | 0 | — |
| 5.0 | — | 0.200*3 | 0.0025 | 1 : 0.013 |

*1N: Normal; this value was calculated on the basis of initially added KOH.
*2M: mol/liter
*3Saturated value In view of the data set forth in Tables 1A and 1B, the substantial stability of alkali manganate in an alkaline aqueous solution would be apparent over wide ranges of manganate and alkali hydroxide concentrations.

EXAMPLE 2

A 500cc-gas absorbing bottle with a sintered-glass filter was charged with 200cc of an absorbing liquid (or sorbent solution) having concentrations of 0.2M of $K_2MnO_4$ and 2N of KOH, and was maintained at 25° C in a thermostat water bath. Several gas mixtures of NO or NOx—$N_2$ were respectively caused to pass through the absorbing bottle, and the concentrations of NO and $NO_2$ were measured at both the inlet and outlet. The rate of absorption was calculated from the concentrations.

For the purpose of comparison, several absorption tests were carried out in the same manner using absorbing liquids containing $KMnO_4$ or $MnO_2$ as an absorbent.

The results are set forth in Table 2 below.

Further, the same absorption test was carried out with the use of an absorbing liquid containing $Na_2MnO_4$ and NaOH, and the results are also set forth in Table 2.

Table 2

| Run No. | Composition of sorbent solution | Concentration of NOx (ppm) in Inlet gas NO | NO$_2$ | in Outlet gas NO | NO$_2$ | Rate of absorption of NOx(%) |
|---|---|---|---|---|---|---|
| 1 | 0.21 M $K_2MnO_4$ | 990 | 0 | 56 | 0 | 94.3 |
| 2 | -2N KOH*[1] | 760 | 212 | 36 | 3 | 96.0 |
| 3 | 0.2 M $KMnO_4$ | 990 | 0 | 172 | 0 | 82.6 |
| 4 | -2N KOH*[2] | 760 | 212 | 136 | 12 | 84.8 |
| 5 | 4 wt% $MnO_2$ | 990 | 0 | 900 | 0 | 9.1 |
| 6 | -40wt%$HNO_3$ | 760 | 212 | 676 | 148 | 15.2 |
| 7 | 0.21M $Na_2MnO_4$ | 990 | 0 | 57 | 0 | 94.2 |
| 8 | -2N NaOH | 760 | 212 | 36 | 5 | 95.8 |

*[1]Reagent grade $K_2MnO_4$ (purity: 80 wt%) was dissolved in 2N-KOH aqueous solution, and 0.21M was the concentration of [$MnO_4^{2-}$] in the sorbent solution after the separation of precipitated $MnO_2$ by filtration.
*[2]Reagent grade K $MnO_4$ (Purity: > 99 wt %) was dissolved in 2N-KOH aqueous solution.

In view of the data set forth in Table 2 above, is would be apparent that the absorbent solution of the present invention of an alkaline aqueous solution of alkali manganate shows a high absorption rate both for NO and $NO_2$, which is higher than that of other manganese compounds.

EXAMPLES 3

This series of absorption tests were carried out after the same manner as in Example 2 but with various absorbing solutions of different reagent concentrations and various gas mixtures of different nitrogen oxide concentrations set forth in Table 3, and under an absorption temperature of 55° C (temperature of thermostat water bath).

The results are set forth in Table 3 below.

Table 3

| Run No. | Composition of sorbent solution $K_2MnO_4$(M) | KOH(N) | Concentration of NOx (ppm) in Inlet gas*[1] | in Outlet gas | Rate of absorption of NOx (%) |
|---|---|---|---|---|---|
| 1 | 0.053 | 0.48 | 196 | 14 | 92.9 |
| 2 | 0.053 | 0.48 | 1035 | 62 | 94.0 |
| 3 | 0.050 | 5.04 | 1035 | 52 | 95.0 |
| 4 | 0.207 | 2.05 | 107 | 1 | 99.1 |
| 5 | 0.207 | 2.05 | 612 | 3 | 99.5 |
| 6 | 0.207 | 2.05 | 1035 | 8 | 99.2 |
| 7 | 0.988 | 0.49 | 1035 | 6 | 99.4 |
| 8 | 0.945 | 4.95 | 196 | 1 | 99.5 |
| 9 | 0.945 | 4.95 | 1035 | 5 | 99.5 |

*[1]Ratio of NO to NOx in Run 1 – 4 and 6 – 9 are 80 – 85% and in Run 5, 49%.

EXAMPLE 4

Pyrolusite crushed into a particle size of 150 mesh (manganese content of 48.5 weight percent) was mixed with NaOH at a NaOH/$MnO_2$ ratio of 2.5, and was calcined for 2 hours at a temperature of 350° C in an electric furnace. The calcined product was, after being cooled, eluted with a 3N NaOH solution and separated from the insoluble by filtration to produce an aqueous solution having concentrations of 0.12M of $K_2MnO_4$ and 3.1N of NaOH. Into an absorption tower of countercurrent contact type packed with Tellerette at a packing height of 4 meters and having an internal diameter of 300 millimeters, 400 l of the solution was charged, and a gaseous mixture consisting of 285 ppm of NOx (NO 218 ppm and $NO_2$ 67 ppm) and the remainder of air was treated through the tower under the conditions of gas flow rate of 90 m³/hr (NTP), liquid flow rate of 1.2 m³/hr and absorbing temperature of 50° C.

The gaseous mixture was continuously analyzed both at the inlet and outlet of the absorption tower, and the rate of removal of NOx was calculated at 91%.

EXAMPLE 5

Two absorbing bottles (30 mm$\phi$, 250 mmH) are connected in series, into which a mixed aqueous solution of potassium manganate (0.2M) and caustic potash (2N) is put in a quantity of 60 ml and 40 ml, respectively, and NOx-containing gas (NOx content of about 6.4%, NO:$NO_2$ = 1 : 10) is introduced at a rate of 500 ml/min. for 2 hours. The rate of absorbing NOx reached substantially 100 %.

In the same experiment using an aqueous solution of potassium permanganate, the ratio of absorption of NOx is as low as 85% in comparison with the case of using aqueous solution of potassium manganate.

What we claim is:

1. A method for removing oxides of nitrogen (NOx) existing in a gaseous mixture and consisting predominantly of nitric oxide and nitrogen dioxide, which consists essentially of subjecting said gaseous mixture to a contact-reaction with an aqueous solution consisting essentially of an alkali metal manganate and an alkali metal hydroxide, thereby absorbing the oxides of nitrogen into the solution.

2. The method according to claim 1, in which said alkali metal manganate is selected from the group consisting of sodium manganate and potassium manganate, and said alkali metal hydroxide is selected from the group consisting of sodium hydroxide and potassium hydroxide.

3. The method according to claim 1, in which the concentration of said alkali metal hydroxide coexistent with said alkali metal manganate is from 0.5 to 5 N.

4. The method according to claim 1, in which the concentration of nitric oxide in said gaseous mixture is higher than that of nitrogen dioxide.

5. A method according to claim 3, in which the concentration of the alkali metal manganate is from 0.01 to 1 mol/liter.

6. A method according to claim 5, wherein the alkali metal manganate is from 0.05 to 0.5 mol/liter.

* * * * *